United States Patent [19]

Chang et al.

[11] Patent Number: 4,910,686
[45] Date of Patent: Mar. 20, 1990

[54] POSTAGE METER WITH NON-DOLLAR AMOUNT INDICIA

[75] Inventors: Sung S. Chang; Seymour Feinland, both of Stamford; Hans C. Mol, Wilton, all of Conn.

[73] Assignee: Pitney Bowes Inc., Stamford, Conn.

[21] Appl. No.: 229,529

[22] Filed: Aug. 8, 1988

Related U.S. Application Data

[63] Continuation of Ser. No. 848,109, Apr. 4, 1986, abandoned.

[51] Int. Cl.$^4$ .............................................. B41B 00/00
[52] U.S. Cl. ................................ 364/519; 364/464.02
[58] Field of Search .................... 177/25.15, 2; 364/464.03, 466, 518, 464.02, 519

[56] References Cited

U.S. PATENT DOCUMENTS

| | | | |
|---|---|---|---|
| 3,635,297 | 1/1972 | Salava | 364/464 X |
| 3,901,797 | 8/1975 | Storace et al. | 177/4 X |
| 4,180,856 | 12/1979 | Check, Jr. et al. | 177/25.15 X |
| 4,301,507 | 11/1981 | Soderberg et al. | 364/464 |
| 4,342,038 | 7/1982 | Lemelson | 177/2 X |
| 4,351,033 | 9/1982 | Uchimura et al. | 364/466 X |
| 4,376,981 | 3/1983 | Check, Jr. et al. | 364/466 X |
| 4,410,961 | 10/1983 | Dlugos et al. | 364/466 X |
| 4,462,473 | 7/1984 | Valestin | 364/466 X |
| 4,511,793 | 4/1985 | Racanelli | 364/466 X |
| 4,516,209 | 5/1985 | Scribner | 364/466 X |
| 4,544,929 | 10/1985 | Lemelson | 177/2 X |
| 4,639,873 | 1/1987 | Baggarly et al. | 364/466 |
| 4,649,266 | 3/1987 | Eckert | 235/432 |

*Primary Examiner*—Parshotam S. Lall
*Assistant Examiner*—Edward R. Cosimano
*Attorney, Agent, or Firm*—Charles G. Parks, Jr.; David E. Pitchenik; Melvin J. Scolnick

[57] ABSTRACT

A postage meter which imprints non-dollar amount indicia representative of postage value determining information. The meter receives postage value determining information, such as mail piece weight, associated with particular mail pieces; computes the corresponding postage; imprints the particular envelope with the postage value determining information; and accounts for the postage thus expended. Because the range of postage value determining information is small compared the possible range of postage setting information the meter to print is quicker and easier. In one embodiment the meter also prints a validating indicia which assures that the rates used to compute the postage value are valid. In another embodiment the postage value determining information includes information which characterizes a batch of mail, for example as being entitled to a pre-sort discount.

6 Claims, 5 Drawing Sheets

POSTAGE METER WITH NON-DOLLAR AMOUNT INDICIA

This application is a continuation, of application Ser. No. 848,109, filed 4/4/86 now abandoned.

BACKGROUND OF THE INVENTION

Conventionally postage meter setting mechanisms have included a plurality of printing wheels, four or five of such wheels, rotatably mounted coaxially within the print drum of the postage meter. Embossed around the circumference of each print wheel is a plurality of numeral characters generally ranging from zero to nine. Each print wheel has an associated drive mechanism for selectively positioning the print wheel in a given tangentially aligning such that a given character is positioned within the a print opening in the print drum. By aligning the print wheels to the print drum opening, a given dollar currency amount can be indicated within the postage indicia printing by the postage meter on a envelope.

Where the postage meter is part of a high speed mixed mail processing system, it is not extraordinary for the print wheel settings to require modification or changing after each postage meter print cycle. That is, because each mail piece may require a different indicia postage value, which amount is a function of the weight of the respective mailpiece, to be printed on the mailpiece.

As a result of required print wheel resets, one of the limitations to indicia printing speed of the postage meter, i.e., mail piece processing rate, is the print wheel setting-time required between postage meter print cycles. Therefor, increasing the processing rate of the postage meter is in part dependent upon minimizing the print wheel setting time required between print cycles. The minimum print wheel setting speed is a function of the speed position accuracy of the print wheel drive mechanism and the maximum radial distance between the two furthermost print wheel characters within the value range. It is readily recognized that the postage meter print wheel setting speed is adversely affected by the number of print wheels which must be set where such wheel are set sequentially.

SUMMARY OF THE INVENTION

It is accordingly, an objective of the present invention to present a means of decreasing the print wheel setting time and thereby promote an increase in the postage meter processing rate. In accordance with the objective of the present invention, it is an object of the present invention to present postage meter postal value ciphered print wheel assemble having reduced radial distance between the furthermost active print wheel characters. It is a further object of the present invention to present a print wheel assemble having a reduced number of print wheels.

The above objects are achieved and the disadvantages of the prior art are overcome in accordance with the subject invention by means of a postage meter which includes a memory or other storage apparatus for storing postal rates; an establishing apparatus which establishes the particular postage value determining information imprinted on particular mail pieces; computing apparatus which responds to the establishing apparatus and the memory to compute the postage values for the particular mail pieces in accordance with the postal rates and the imprinted postage value determining information; and, accounting apparatus for accounting for the computed postage value so expanded. By "postage value determining information" herein is meant information such as weight, class of service, etc. which comprises the independent variables operated on by the function defined by the stored postal rates to compute the appropriate postage values. By "establishing particular postage value determining information" herein is meant assuring that the information imprinted on a particular mail piece is the information which is used to compute the postage values associated with that mail piece and for which the postage meter accounts.

In a preferred embodiment of the subject invention the postage meter further includes apparatus for assuring that the postage rates used in the meter are valid (i.e. current and accurate).

In another preferred embodiment of the subject invention the above described assuring apparatus further includes secure apparatus for imprinting each mail piece with indicia indicating the currency and accuracy of the postal rates in use.

In still another preferred embodiment of the subject invention the postage value determining information includes an element which characterizes an entire batch of mail pieces which are to be processed.

Those skilled in the art will recognize that the subject invention achieves the objects set forth above and may advantageously be used to meter a high volume flow of mail pieces. Other objects and advantages of the subject invention will be directly apparent to those skilled in the art from consideration of the attached drawings and of the detailed description set forth below.

DETAILED DESCRIPTION OF THE PREFERRED EMBODIMENT

Figure 2:
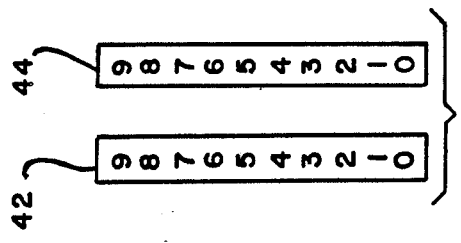
FIG. 2 shows the set of variable indicia which may be used to imprint postage values by the meter of FIG. 1.
Figure 1:
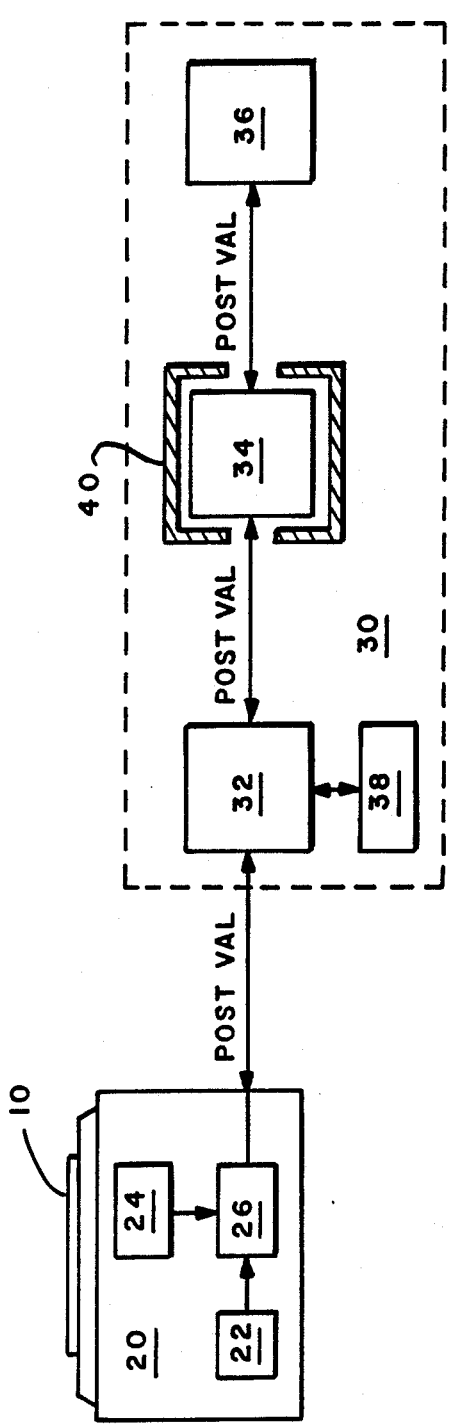
FIG. 1 shows a schematic block diagram of a prior art mail processing system including a postage meter.

FIG. 1 shows a mail processing system in accordance with the prior art. A mail piece 10 is weighed upon a postal scale 20. Scale 20 includes a load cell 22, a rate memory 24, and a processor 26. Processor 26 computes the appropriate postage value for mail piece 10 in accordance with postal rates stored in memory 24 as a function of the weight measured by load cell 22 and other inputs which may be provided by an operator. A more complete description of postal scale 20 may be found in U.S. Pat. No. 4,376,981, title; Electronic Postal Metering System, to; Check et al., issued; Mar. 15, 1983. The computed postage value is then transmitted to a postage meter, such as that taught in the above referenced U.S. Pat. No. 4,301,507; as is also taught in the above referenced patents. Meter 30 includes control unit 32, accounting unit 34, and print unit 36. Meter 30 also includes keyboard 38 which may be used for manual setting of the meter and for other functions which are not relevant to this discussion. Control unit 32 receives the computed postage value and transmits it to accounting unit 34. Accounting unit 34 temporarily stores the postage value and retransmits it to print unit 36. Print unit 36 then selects appropriate indicia from sets of indicia 42, 44 shown in FIG. 2 to represent the postage value. As will be more fully described below, these indicia are carried on the surface of settable printwheels which are rotated by print unit 36 so that pairs of indicia (i.e. numerals) directly corresponding to the computed postage value are positioned for printing. (Those skilled in the art will recognize that though only two sets of indicia have been shown for simplicity of illustration typical prior art postage meters included three or more printwheels having indicia to allow printing of postage values in excess of one dollar and/or fractional cent values). Once the printwheels are positioned to select the appropriate indicia, meter 30 is enabled to print. When mail piece 10 is positioned properly in meter 30 a detector (not shown), commonly referred to as a "trip switch", signals print unit 36, which activates the print mechanism and signals accounting unit 34 to account for the postage value as expended. Account unit 34 subtracts the postage value from the previously entered dollar value stored in a "descending register" and adds it to the total value expended stored in the "ascending register", which registers are maintained in a non-volatile memory to account for postage expenditures. Shielded housing 40 is provided to provide additional security for this critical information stored in accounting unit 34.

From the above description it may be seen that the critical function of prior art postage meters is to account for postage expended if and only if indicia directly corresponding to the postage value expended are imprinted on the mail piece.

Figure 3:
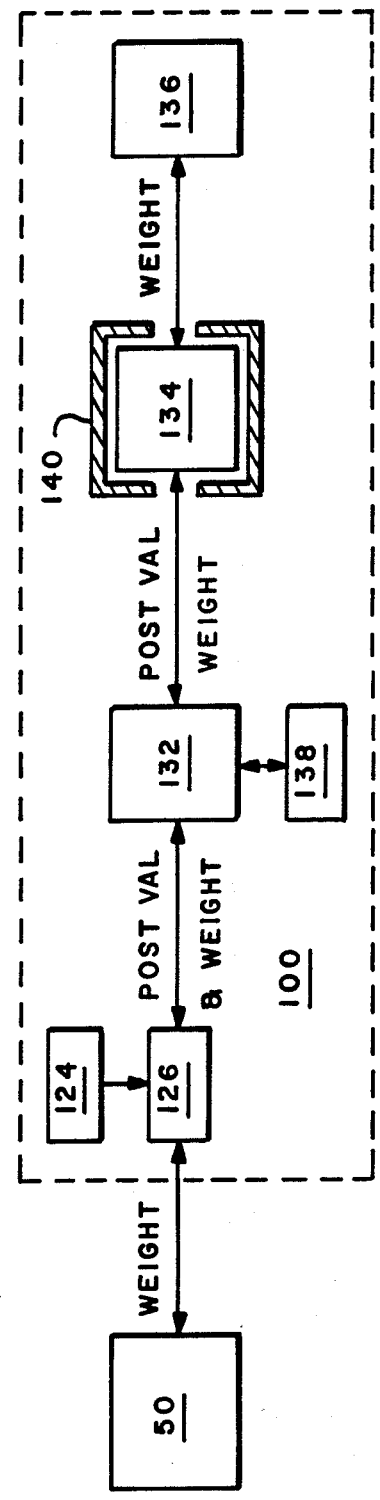
FIG. 3 shows schematic block diagram of a mail processing system including a postage meter in accordance with the subject invention.

Turning to FIG. 3 a mail processing system in accordance with the subject invention is shown. In contrast to prior art meter 30 the input to meter 100 is a signal representative of the weight of the mail pieces. This signal is provided by apparatus 50. Apparatus 50 provides a stream of weight signals corresponding to a flow of mail pieces, and its particular nature is not considered to be relevant to the subject invention. For example, apparatus 50 may be an intelligent inserter system, which computes the weight of mail pieces from an a priori knowledge of the weights of the constituent elements which make up the mail piece or may be a high speed "weigh-on-the-fly" scale for determining the weight of mail pieces in a high volume flow.

In another embodiment apparatus 50 may be a scanner which scans preprinted machine-readable postage value determining information from envelopes, in particular from encoded marks such as dashes aligned with the address field on an insert visible through the envelope window, and placed there typically by a computer printer during a bill imprinting operation. In this embodiment the scanned information may be confirmed by preprinting the postage value determining information in the manner to be described below; depending upon the error rate and reliability which may be achieved with a scanning system.

In meter 100 the weight signal is received by processor 126 when then computes the appropriate postage value in accordance with postal rates stored in memory 124 as a function of the weight and other information which may be provided in a manner more fully described below. The operation of processor 126 and memory 124 is substantially similar to that of prior art processor 26 and memory 24, with the difference that processor 126 transmits both the computed postage value and the weight to control unit 132 of meter 100. Control unit 132 retransmits the postage value and weight to accounting unit 134. Accounting unit 134 temporarily stores the postage value and retransmits the weight to printing unit 136.

Again, the person skilled in the art will recognize that, with the exceptions noted above, the operation of units 132, 134, 136 is substantially similar to the operation of prior art units 32, 34 and 36.

Figure 4:
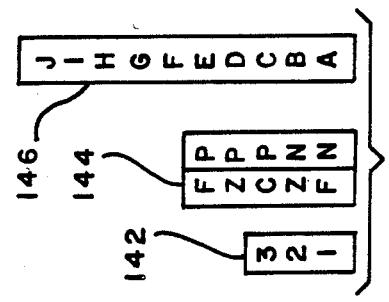
FIG. 4 shows a set of variable indicia which may be used with the postage meter of FIG. 3.

Print unit 136 then selects indicia corresponding to the weight from indicia set 142, shown in FIG. 4. Again, as with prior art meter 30, indicia 142 are carried on the surface of settable printwheels. However, in the embodiment of FIG. 3 advantage is taken of the fact that the maximum weight of mail pieces in high volume flows in typically limited to 3. Thus indicia set 142 includes only 3 characters, in contrast to the 100 character pairs of FIG. 2. Thus the selection of the proper character from indicia set 142 will require at most two of a single wheel. As a result meter 100 may achieve much higher setting speeds without increased costs or power disapation.

FIG. 4 also shows indicia sets 144 and 146. Indicia set 144 includes characters corresponding to the various "endorsements" available with first class mail. (By "endorsement" herein is meant the discounts which may be applied to the postage according to the amount of pre-sorting done by the mailer). For the embodiment shown in FIG. 3 these endorsements are:

| | |
|---|---|
| FP | Pre-sort 1st. Class |
| ZP | ZIP plus 4 Pre-sort |
| CP | CAR-RT Pre-sort |
| CN | Non-Sorted ZIP plus 4 |
| FN | 1st. Class (without discount) |

Indicia set 146 consists of a set of arbitrary characters which serve to validate that the postal rates used in meter 100 are current and accurate.

Though indicia sets 144 and 146 are variable they are constant from mail piece to mail piece within a given batch of mail. Set 144 is changed only with successive batches of mail and set 146 is changed only when the postal rates stored in memory 124 are changed. Accordingly these indicia may be considered as fixed with respect to the operation of postage meter 100 from mail piece to mail piece and they pose no burden on meter 100 with respect to setting speed.

The appropriate selection and setting of indicia sets 144 and 146 will be more fully described below.

Figure 5:
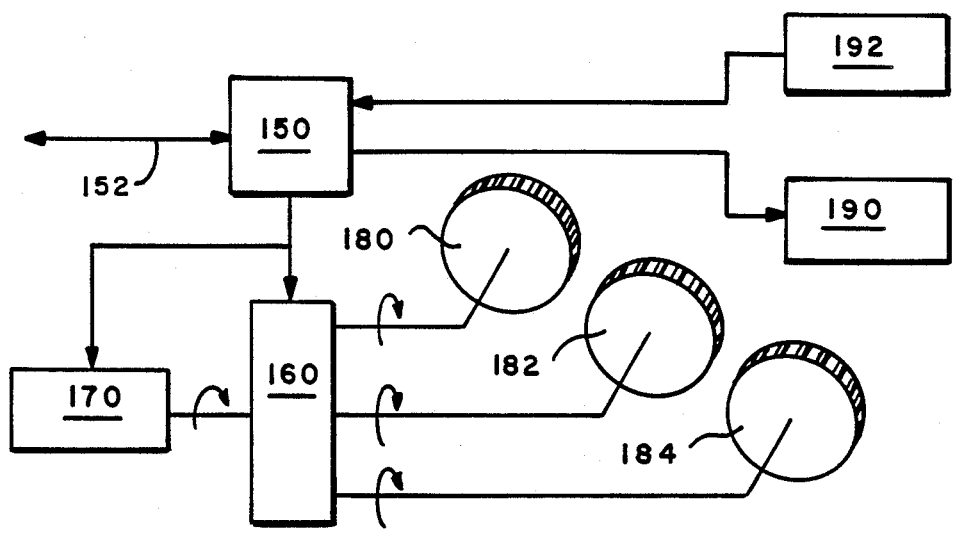
FIG. 5 shows a schematic block diagram of the print mechanism used to imprint the variable indicia of FIG. 4.

FIG. 5 shows a schematic block diagram of printing unit 136 in accordance with one embodiment of the subject invention. Printing unit 136 includes microprocessor based controller 150 which is in bi-directional communication with accounting unit 134 through line 152. Controller 150 receives weight information for controlling the setting of weight wheel 180 as well as additional information for controlling the setting of endorsement wheel 182 and rate validation wheel 184. As noted above wheels 182, 184 remain fixed through the processing of a given batch of mail and the process of setting these wheels will be described more fully below.

When controller 150 receives weight information from accounting unit 134 it controls transmission 160 to couple weight wheel 180 to drive motor 170 and then controls motor 170 to set weight wheel 180 in accordance with the received weight information.

When a mail piece is properly positioned in meter 100 trip switch 192 signals controller 150; which then activates print driver 190 to print indicia on the mail piece, and also signals accounting unit 134 to account for the corresponding postage value. The printed indicia includes characters selected from indicia sets 142, 144, 146 as well as fixed indicia (not shown), such as logos or advertising material.

A more complete understanding of the control and mechanical aspects of the operation of print unit 136 in accordance with the embodiment of FIG. 5 may be obtain from the above referenced U.S. patents. Those skilled in the art will recognize that the mechanical aspects and immediate control of wheels 180, 182 and 184 are substantially similar to that found in prior art meter 30; though, as will be seen, the sequence of operations and the meaning of indicia selected are very substantially different.

Figure 6:
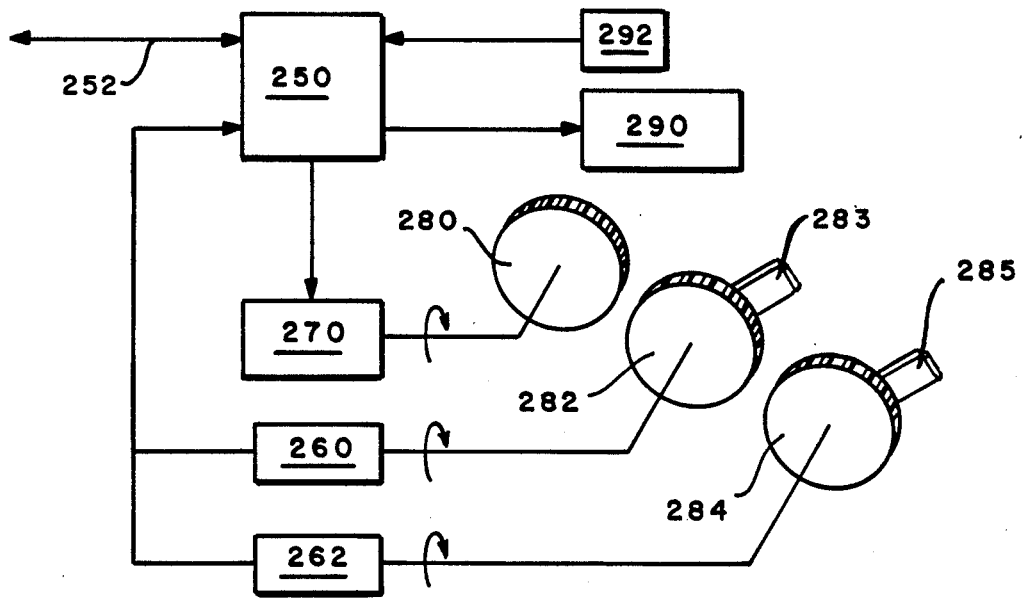
FIG. 6 shows a schematic block diagram of an alternative print mechanism.

FIG. 6 shows a schematic block diagram of printing unit 136 in accordance with another embodiment of the subject invention. Microprocessor base controller 250 again is in bi-directional communication with accounting unit 134 through line 252 to receive weight information defining the setting of weight wheel 280. In the embodiment of FIG. 6 an endorsement wheel 282 and rate validation wheel 284 are manually set by an operator through levers 283 and 285. Weight wheel 280 is directly coupled to motor 270 and when controller 250 receives a weight signal it directly controls motor 270 to set weight wheel 280. Also, as will be more fully described below prior to each operation of postage meter 100 controller 250 tests shaft encoders 260, 262 to determine the settings of wheels 282, 284. When wheel 280 is set and the settings of wheels 282, 284 are determined meter 100 is enabled and when trip switch 292 detects a mail piece controller 250 activates print driver 290 to print indicia and signals accounting unit 134 to account for the postage value in the manner described above.

Figure 7:
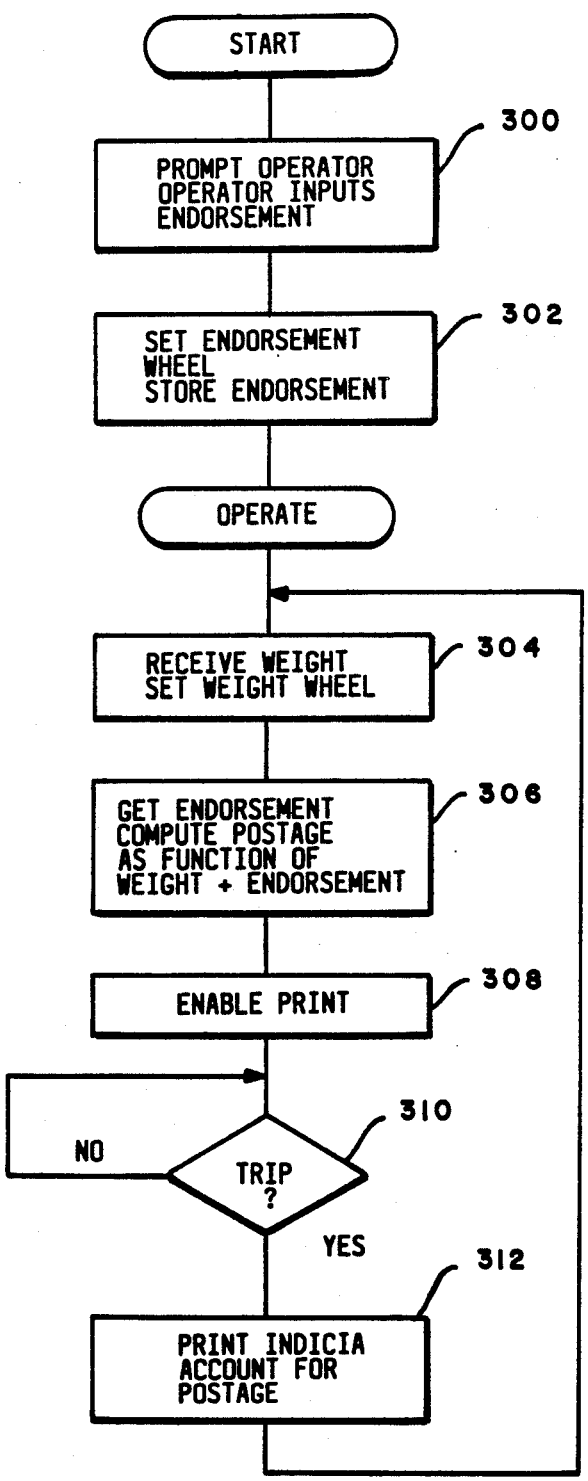
FIG. 7 shows a flow chart of the operation of the embodiment of the subject invention.

FIG. 7 shows a flow chart of the operation of the subject invention in accordance with the embodiment of FIG. 5. At 300 meter 100 prompts the operator to enter the appropriate endorsement, and the operator enters the endorsement through keyboard 138. At 302 control unit 132 transmits the endorsement information through accounting unit 134 to printing unit 136 to set endorsement wheel 182. Control unit 132 also transmits the endorsement information to processor 126 for use in computing postage values.

Meter 100 is now initialized for operation. At 304 meter 100 receives weight information from apparatus 50 and sets weight wheel 182 accordingly. At 306 meter 100 computes the postage value as a function of the weight and the endorsement. At 308 meter 100 enables printing unit 136. At 310 meter 100 waits for a trip signal and when the trip signal is received at 312 prints the indicia and accounts for the postage value expended. The meter 100 will stand ready to receive the next mailpiece by returning to 304, i.e., awaiting weight information until the last mail piece is processed and the system is reinitialized for the next batch or until powered down.

A meter as described above would provide satisfactory operation except for the unfortunate fact that postal rates change from time to time. Accordingly it is preferable that meter 100 includes some mean for validating that the postal rates used are current and accurate.

Figure 8:
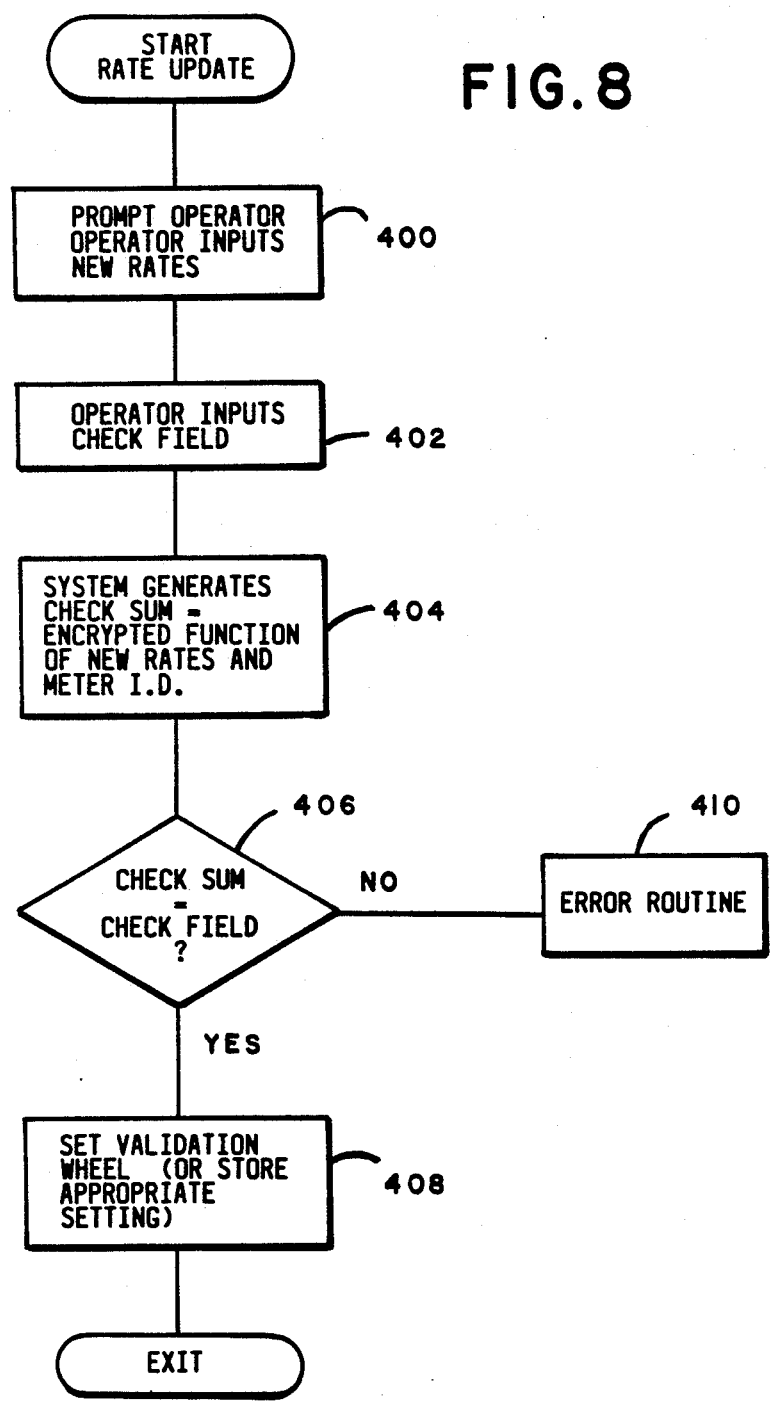
FIG. 8 shows a flow chart of a rate update operation in accordance with the subject invention.

This validation function is achieved when meter 100 is operated in accordance with the flow chart of FIG. 8 to perform a rate update operation. At 400 meter 100 prompts the operator to input new postal rates. Given the relative simplicity of first class mail rates meters intended for use only with first class mail may be updated by entry of postal rate data through keyboard 138. Alternatively the new data may be entered through conventional data links, portable media, or Programmable Read Only Memories (PROMS). At 402 the operator then inputs a checkfield provided by the postal service or the vendor. At 404 the system computes a checksum as an encrypted function of the new rates and of the meter identification number. (Use of unique checksums prevents failure of security for a single meter from promulgating through the entire meter population). At 406 meter 100 tests if the checksum equals the checkfield. If they are equal at 408 meter 100 sets validation wheel 814 to the next, or other appropriate, setting and exits. Since this routine is the only mechanism provided for setting of validation wheel 184 the postal service may be sure that the imprint of the proper character chosen from indicia set 146 validates the postal rates in use. If at 406 the checksum does not equal the checkfield an error routine is entered at 410. Preferably this routine will allow a predetermined number of attempts and then lock up the system.

In embodiments of the subject invention in accordance with FIG. 7, where validation wheel 284 is manually set, at 408 meter 100 will store the appropriate setting for wheel 284 in a predetermined location. For further security this setting may be stored in encrypted form unique to each particular meter.

Figure 9:
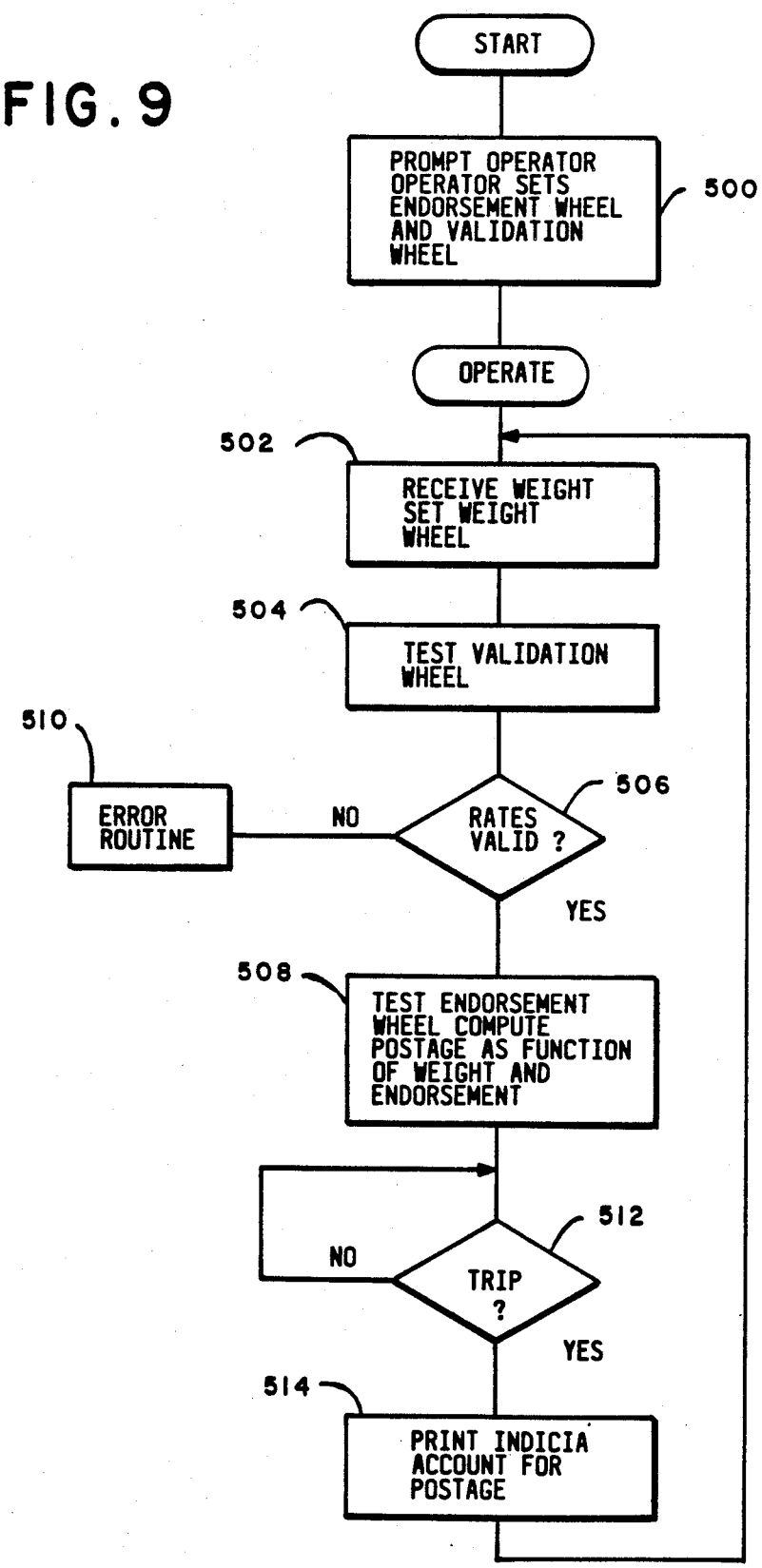
FIG. 9 shows a flow chart of the operation of a second embodiment of the subject invention.

FIG. 9 shows a flow chart of the operation of an embodiment of the subject inventon in accordance with FIG. 6. At 500 meter 100 prompts the operator to manually set endorsement wheel 282 and validation wheel 284. Meter 100 is then in operating mode and receives the weight and sets weight wheel to the appropriate weight at 502. At 504 meter 100 tests validation wheel 284 against the previously stored setting. If at 506 the rates are valid at 508 meter 100 tests endorsement wheel 282 to determine the endorsement and computes the postage value as a function of the weight and endorsement at 508. Subsequent to determining the endorsement and computing the postage value at 508, the system proceeds to 512 whereupon a check is performed to ascertain whether a respective mailpiece is properly positioned for imprinting, i.e., if a trip signal has been sent to 512. If the rates are not valid at 506 meter 100 enters an error routine at 510. At 512 meter 100 waits for a trip signal and, when the signal is received, at 514 prints the indicia and accounts for postage. The meter 100 will stand ready to receive the next mail piece by returning to 502, i.e., awaiting weight information until the last mail piece is processed and the system is reinitialized for the next batch, or until powered down.

It should be understood that the particular embodiments disclosed in the above detailed description and the attached drawings have been provided by way of illustration only. In particular those skilled in the art will readily recognize that other architectures then that shown are possible, and that particular sequences of operation may easily be rearranged. Indeed with the continuing decline in microprocessor prices and increases in their capability it may well prove preferable to combine functions now carried out by two or more separate units. Accordingly limitations on the subject invention are to be found only in the claims set forth below.

What is claimed is:

1. A postage meter having imprinting means for printing a postage indicia on a mailpiece, comprising:
   (a) said imprinting means having at least one print wheel, said print wheel having embossed circumferentially therearound a plurality of cipher characters, and print wheel drive mean for rotatably positioning said print wheel;
   (b) microprocessor means having means for storing a plurality of weight ranges respective assignable to a particular postage rate and having actuation means for causing said drive means to position said print wheel such that one of said cipher characters uniquely corresponding to a respective one of said weight ranges is positioned to a print position for printing of said cipher character on said envelope;
   (c) informing means for determining the weight of said mailpiece and informing said microprocessor thereof;
   (d) said microprocessor means having comparison mean for determining which of said weight ranges said weight is within and actuating said actuation means to corresponding position said print wheel;
   (e) accounting means for accounting for said postage rate corresponding to said one of said cipher characters; and,
   (f) assuring means for assuring that said postage rates are valid;

2. A postage meter having imprinting means for printing a postage indicia on a mailpiece, comprising:
   (a) said imprinting means having at least one print wheel, said print wheel having embossed circumferentially therearound a plurality of cipher characters, and print wheel drive mean for rotatably positioning said print wheel;
   (b) microprocessor means having computing means for computing a particular postage rate for a given mailpiece weight relative to a given weight range and having actuation means for causing said drive means to position said print wheel such that one of said cipher characters uniquely corresponding to a respective one of said weight ranges is positioned to a print position;
   (c) informing means for determining the weight of said mailpiece and informing said microprocessor computing means thereof;
   (d) accounting means for accounting for said postage rate corresponding to said one of said cipher characters; and,
   (e) assuring means for assuring that said postage rates are valid;

3. A postage meter having imprinting means for printing a postage indicia on a mailpiece, comprising:
   (a) said imprinting means having a first and second print wheel, said print wheels having respectively embossed circumferentially therearound a plurality of cipher characters, and first and second print wheel drive mean for rotatably positioning said respective print wheel;
   (b) microprocessor means having means for storing a plurality of weight ranges as a function of postal mail classes respective assignable to a particular cipher character of said first print wheel and having actuation means for causing said first drive means to position said first print wheel such that a corresponding one of said cipher characters is positioned to a print position;
   (c) informing means for determining the weight of said mailpiece and informing said microprocessor thereof;
   (d) said microprocessor means having comparison mean for determining which of said weight ranges said weight is within as a function of postal mail class and actuating said actuation means to corresponding position said print wheel to said print position.
   (e) said microprocessor having input means for selectively informing said microprocessor of the desired cipher to be printed by said second print wheel and having second drive means for correspondingly positioning said second print wheel, whereby said cipher of said second print wheel is representative of said mailpiece postal mail class;
   (f) accounting means for accounting for said postage rate; and,
   (g) assuring means for assuring that said postage rates are valid.

4. A postage meter as claimed in claim 3 wherein said weights are determined by a mail processing apparatus, such as an inserter system, and are input to said postage meter, and the output flow of mail pieces from said processing apparatus passes through said postage meter for metering.

5. A postage meter as described in claim 3 said weights are determined by an apparatus such as a scanner for scanning said postage value determining information from preprinted indicia on said particular mail pieces.

6. A postage meter as claimed in claim 3 wherein said assuring means comprises:
   (h) said imprinting means having a third print wheel, said third print wheel having embossed circumferentially therearound a plurality of cipher characters, and third print wheel drive mean for rotatably positioning said third print wheel; and,
   (i) said microprocessor having second input means for selectively informing said microprocessor of the desired cipher to be printed by said third print wheel and having third drive means for correspondingly positioning said third print wheel, whereby said cipher of said third print wheel is representative of now valid postal mail class rate of said accounting means.

* * * * *